Sept. 10, 1968     E. STOCKLIN     3,400,906
REMOTE CONTROL VALVE FOR HEATING INSTALLATIONS
Filed Dec. 23, 1965
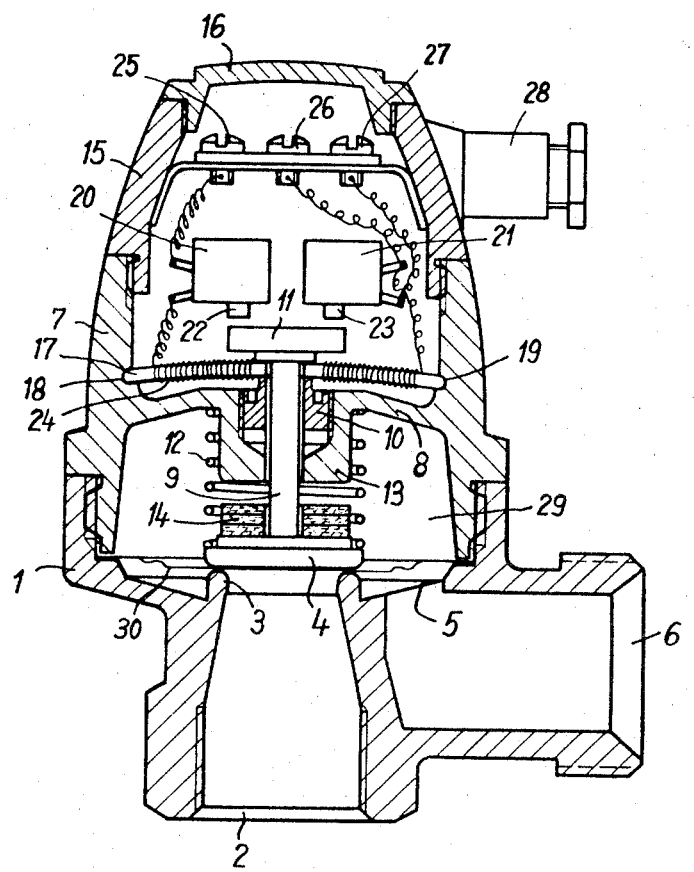
Inventor
Emilio Stocklin
By
Lane, Aitken, Dunner & Ziems
Attorneys

United States Patent Office 3,400,906
Patented Sept. 10, 1968

3,400,906
REMOTE CONTROL VALVE FOR HEATING INSTALLATIONS
Emilio Stocklin, Schulstrasse 20, Urdorf, Zurich, Switzerland
Filed Dec. 23, 1965, Ser. No. 515,946
Claims priority, application Switzerland, Dec. 23, 1964, 16,576/64
10 Claims. (Cl. 251—11)

ABSTRACT OF THE DISCLOSURE

A hot water zone valve having a heat motor for opening and closing the valve under control of a thermostat. The heat motor comprises a beam restrained at its ends so as to bow when heated to actuate the valve element of the valve.

---

This invention concerns a remote controlled valve for heating installations for automatic control of warm water input depending on the room thermostat-controlled domestic temperature. If the temperature falls below a certain level in the controlled room, then the thermostat closes by means of a contact an electric circuit on which the valve is actuated. The latter can be mounted, for example, on hot water boilers. A warm water heating installation can be partitioned in several temperature zones independent of one another by use of these remote controlled valves, in each zone a thermostat being located which cooperates with a valve.

The essential feature of the invention consists in that the valve has a thermoelement in form of a flexible transverse beam which opens the valve disk under the influence of a heating coil switched on by the room thermostat closes again after switching off of the heating coil.

With the arrangement of the present invention a valve can be made which is adapted for a temperature range of 39.2° F.–239° F. and for gauge pressures up to 10 atmospheres. Besides the valve works dependably and noiselessly and can be manufactured inexpensively.

In an embodiment the cross beam can be manufactured from a material with large dilation coefficient, e.g., from copper.

Preferably, the cross beam is formed as a flat spring and is provided with a heating coil while its ends are supported with no play against the casing. The cross beam can act via the valve stem upon the valve disk.

In the area of movement of the transverse beam, two switches can be arranged, of which the one switches on a circulating pump by means of relays, and the other limits the motion of said transverse beam by shutting off the heating coil. The circulating pump conveys the hot water through the pipe system, until the temperature has climbed to such a level that the room thermostat opens the circuit for the heating coil and the transverse beam returns to the starting position, so that the valve disk closes under the pressure of a spring.

The valve compartment in which the switch arrangement is located can be sealed off by a membrane against leakage of water. For the case that water should leak in nevertheless by the untightening of the membrane, swellable disks can be arranged which absorb the moisture and thereby seal off the room with the electrical arrangements against water leakage.

An externally operable adjustment screw can act upon one end of the transverse beam. Hereby a play possibly occurring during manufacture can be remedied. Preferably, the adjustment will be carried out that the transverse beam obtains an initial stress and thereby, after an exactly determined time, reacts upon the warming effect of the heating.

In the drawings, an embodiment of a remote controlled valve is represented by way of example in longitudinal section.

In the lower part 1 of the casing the inlet pipe socket 2 which opens out upwards into the valve seat 3. If the valve disk 4 is lifted off from the valve seat 3, then the hot water of the inlet pipe socket 2 can flow through an aperture 4 into the lateral output pipe socket 6.

Upon the lower portion 1 the central housing portion 7 is set up, which is subdivided by an intermediate wall 8. A valve spindle 9 fastened to the valve disk 4 on its lower end is led through the intermediate wall 8. By means of a threaded socket 10, the spindle 9 is sealed up at the point of its penetration through said intermediate wall 8. Above the wall 8 the spindle 9 is closed off by a contact disk 11. A helical spring 12 presses the valve disk 4 against the valve seat 3. The spring 12 is inserted between said valve disk 4 and a protuberance 13 of said intermediate wall 8 and swellable disks 14.

Another casing portion 15 is set upon the portion 7 and a cover 16 close off the space above the intermediate wall 8. Below the contact disk 11 there is a transverse beam 17 of copper with its ends in support of locations 18, 19 of the casing placed under initial stress, so that it touches the contact disk 11 from below. Above the contact disk 11 the switches 20, 21 are located, whose movable contact elements 22, 23 are in a certain distance from the contact disk. A heating coil 24 is attached to the transverse beam 17 and connected by conductors with the switches 20, 21 and the connection terminals 25, 26, 27. A connection socket 28 permits the waterproof introduction of the feeding lines, in whose circuit lies a room thermostat, not shown in the accompanying drawings.

In order that with the open valve disk 4, no water penetrates into the compartment 29 of the switch arrangement, this compartment is closed off by a metallic membrane 30. If dampness nevertheless enters the compartment 29, the swellable disks 14 then absorb the dampness and effect by their expansion sealing off of the compartment 29 with respect to the compartment beyond, in which the electrical equipment is lodged.

The valve reacts as soon as the room thermostat, as a consequence of a low temperature, closes the contact of the feeding circuit and thereby turns on the heating coil. By the resulting heat the flexible transverse beam is heated to about 482° F. This has a consequent extension of the 50 mm. (12.7″) long flexible transverse beam by about 0.2 mm. (0.07″). Since the flexible transverse beam is clamped firmly at the ends, it can thus only be flexed upwards. Hereupon a considerable force is produced, which is in a position to open the valve disk 4 against the pressure of the spring 12.

As soon as the flexible transverse beam has flexed about 1 mm. (0.4″) the contact disk 11 touches the pointer 23 of the switch 21 and switches the latter on. Thereby a circulatory pump is placed in operation over a relay, which presses the hot water flowing through the valve socket 2 into the outlet portion 6 of the casing and thus conveys it through the whole conduit system.

Upon further heating of the flexible cross-beam 17 the switching in of the switch 20, which interrupts the circuit for the heating coil 24, follows after attaining a flexure of about 2 mm. (0.08″). With the cooling of the flexible cross-beam 17 the flexure retreats and the valve disk 4 is closed by the pressure of the helical spring 12. The installation works in this way completely automatically and maintains the room temperature set on the room thermostat constant.

On one of the ends 18, 19 of the flexible cross-beam 17 and externally operable adjustment screw, not shown in the drawing, may act, with which the initial stress of said flexible beam may be varied.

I claim:

1. A valve having an inlet and an outlet port with a valve element therebetween movable between open and closed positions for controlling fluid flow between said ports, resilient means for normally biasing said valve element to a closed position with a predetermined force, a flexible beam separate from said resilient means and consisting of a single material which increases in length when heated, means for restraining the ends of said beam against outward movement in a manner to force said beam to bow in one direction in response to an increase in its length, heating means for heating said beam to increase its length, and means for connecting said beam to said valve element to move said valve element to an open position against said biasing force as the beam bows in said one direction.

2. The valve as defined in claim 1 wherein said beam is slightly bowed in said one direction in its non-heated position.

3. The valve as defined in claim 1 wherein said heating means is in heat transfer contact with said beam for substantially the entire length of the latter.

4. The valve as defined in claim 1 wherein said beam is made of a material with a large dilatation coefficient.

5. The invention as defined in claim 1 wherein said beam is in the form of a flat spring, and wherein said heating means comprises an electric heating element.

6. The valve as defined in claim 1 wherein said valve element includes a valve spindle and said beam acts directly on said spindle.

7. The valve as defined in claim 1 including two electric switches, means for mounting said switches in position to be sequentially actuated by the bowing of said beam, and circuit means for electrically connecting the last to be actuated of said switches to deactivate said heating means.

8. A valve having a chamber with an inlet and an outlet port, a valve element movable in said chamber between open and closed positions for controlling fluid flow between said ports, sealing means engaging said valve element for sealing said chamber from the fluid passing through said valve, means for normally biasing said valve element to one of said positions, a flexible beam which increases in length when heated, means for restraining the ends of said beam against outward movement in a manner to force said beam to bow in one direction in response to an increase in its length, means for heating said beam to increase its length, means for connecting said beam to said valve element to move said valve element to the other of said positions as the beam bows in said one direction, means forming a compartment within said chamber in which said beam is positioned, and swellable means which expands in the presence of moisture for sealing said compartment from said chamber in the event moisture enters said chamber.

9. The valve as defined in claim 8 wherein said swellable means is mounted for movement with said valve element and seals said compartment from said chamber when said valve element is in said other position and said swellable means is swelled by moisture.

10. The valve as defined in claim 9 wherein said compartment has a common wall with said chamber, and said valve element has a spindle extending through said wall, said swellable means comprising washer shaped discs of swellable material positioned in said chamber and about said spindle in position to sealingly engage said wall and valve element when swelled by moisture.

References Cited

UNITED STATES PATENTS

| | | | |
|---|---|---|---|
| 669,474 | 3/1901 | Broad | 251—11 |
| 672,255 | 4/1901 | Boberg | 277—123 |
| 1,844,071 | 2/1932 | Newell | 251—11 |
| 2,845,080 | 7/1958 | Kraft | 137—199 |
| 2,960,303 | 11/1960 | Smallpeice | 251—11 |
| 3,326,510 | 6/1967 | Kolze. | |

FOREIGN PATENTS 119,546   3/1900   Germany.

ARNOLD ROSENTHAL, *Primary Examiner.*